United States Patent [19]
Davis et al.

[11] Patent Number: 5,456,570
[45] Date of Patent: Oct. 10, 1995

[54] ROTARY PLACER

[75] Inventors: Ellis W. Davis, Jr., Deerwood; Scott C. Erickson, Ironton, both of Minn.

[73] Assignee: Bill Davis Engineering, Inc., Deerwood, Minn.

[21] Appl. No.: 48,853

[22] Filed: Apr. 19, 1993

[51] Int. Cl.⁶ ................................................ B66C 23/00
[52] U.S. Cl. .................. 414/742; 901/40; 414/736; 414/225; 271/11; 271/107
[58] Field of Search ........................ 414/225, 733, 414/736, 737, 742; 901/40; 198/474.1, 476.1, 471.1; 271/11, 107

[56] References Cited

U.S. PATENT DOCUMENTS

| | | | |
|---|---|---|---|
| 2,887,022 | 5/1959 | Lubersky et al. | 93/53 |
| 2,936,681 | 5/1960 | Earp | 93/53 |
| 3,599,541 | 8/1971 | Allen | 93/53 |
| 3,633,470 | 1/1972 | Bingham | 93/53 |
| 3,937,131 | 2/1976 | Kellogg | 93/53 |
| 4,194,442 | 3/1980 | Martelli | 93/53 |
| 4,643,633 | 2/1987 | Lashyro | 414/732 |
| 4,735,600 | 4/1988 | Drewke et al. | 493/314 |
| 4,802,324 | 2/1989 | Everson | 53/398 |
| 4,854,930 | 8/1989 | Miselli et al. | 493/315 |
| 4,881,934 | 11/1989 | Harston et al. | 414/737 X |
| 4,901,843 | 2/1990 | Lashyro | 198/418.3 |
| 4,902,192 | 2/1990 | Ziegler | 414/732 |
| 5,019,029 | 5/1991 | Calvert | 493/315 |
| 5,104,369 | 4/1992 | Calvert | 493/315 |
| 5,105,931 | 4/1992 | Lashyro | 198/471.1 |
| 5,110,282 | 5/1992 | Voss | 414/744.5 X |

*Primary Examiner*—Donald W. Underwood
*Attorney, Agent, or Firm*—Westman, Champlin & Kelly

[57] ABSTRACT

A rotary placer for picking, transferring and placing a carton from a stack of cartons or sleeves in a magazine to an assembly position. The rotary placer includes a frame driven for rotation about a first axis and supporting an arm having an inner end and an outer end. The outer end of the arm has vacuum cups for engaging and releasably retaining a carton for movement from the pick position to the place position. The arm is reciprocated from an extended position to a retracted position. The vacuum cups engage a carton when the arm is in the extended position and the arm retracts to remove the carton from the magazine and carry it toward the place position. The arm again is extended as it reaches the place position. A cam guide controls the movement of the vacuum cups so they move linearly away from a carton in the magazine.

16 Claims, 12 Drawing Sheets

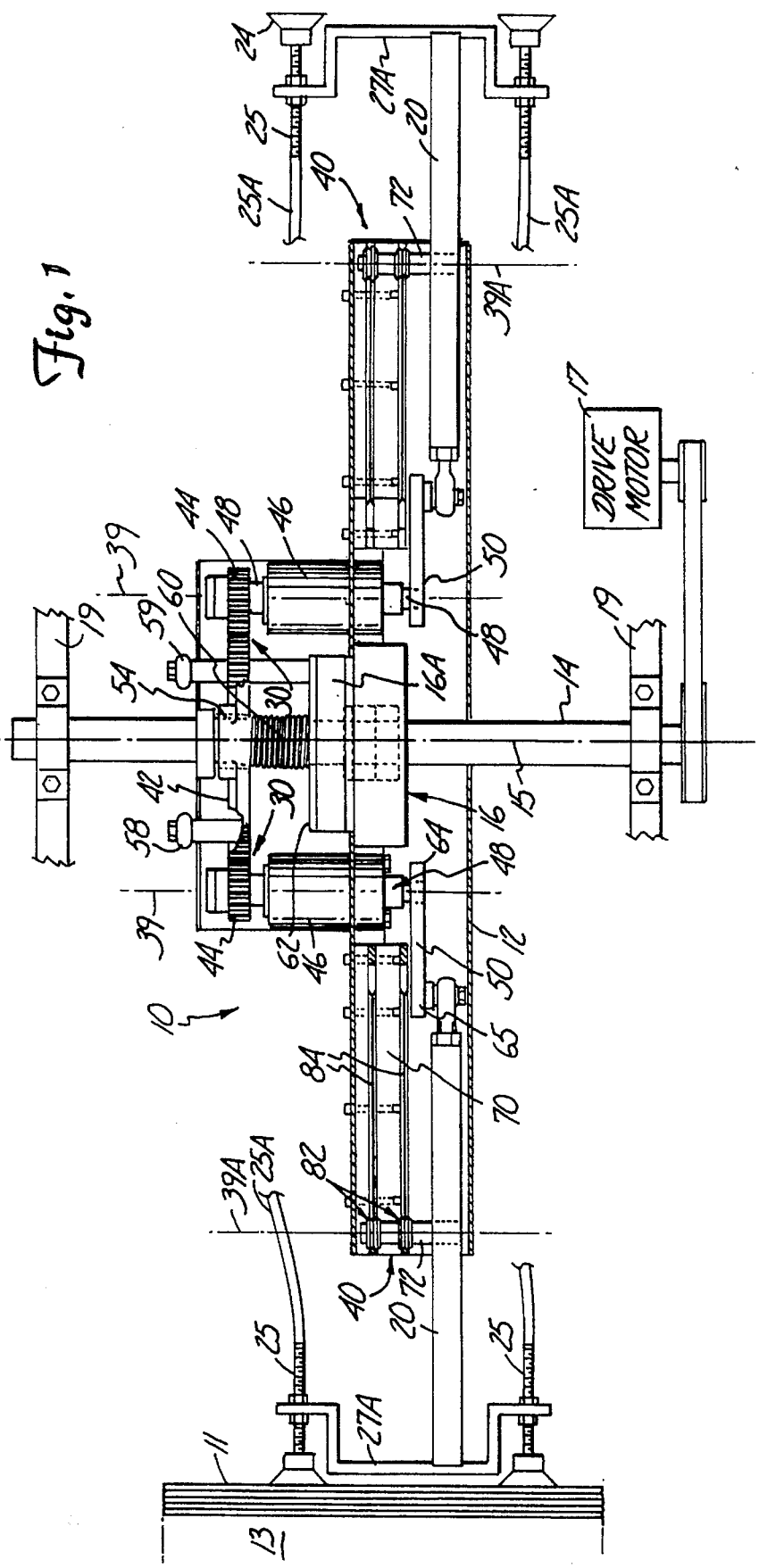

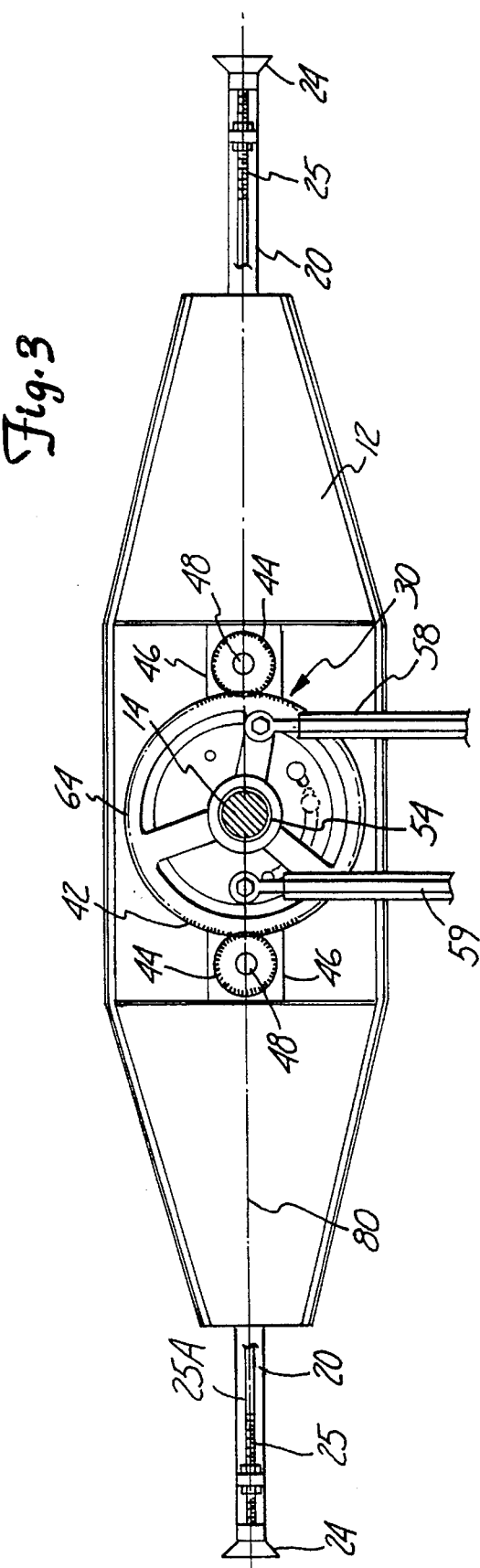

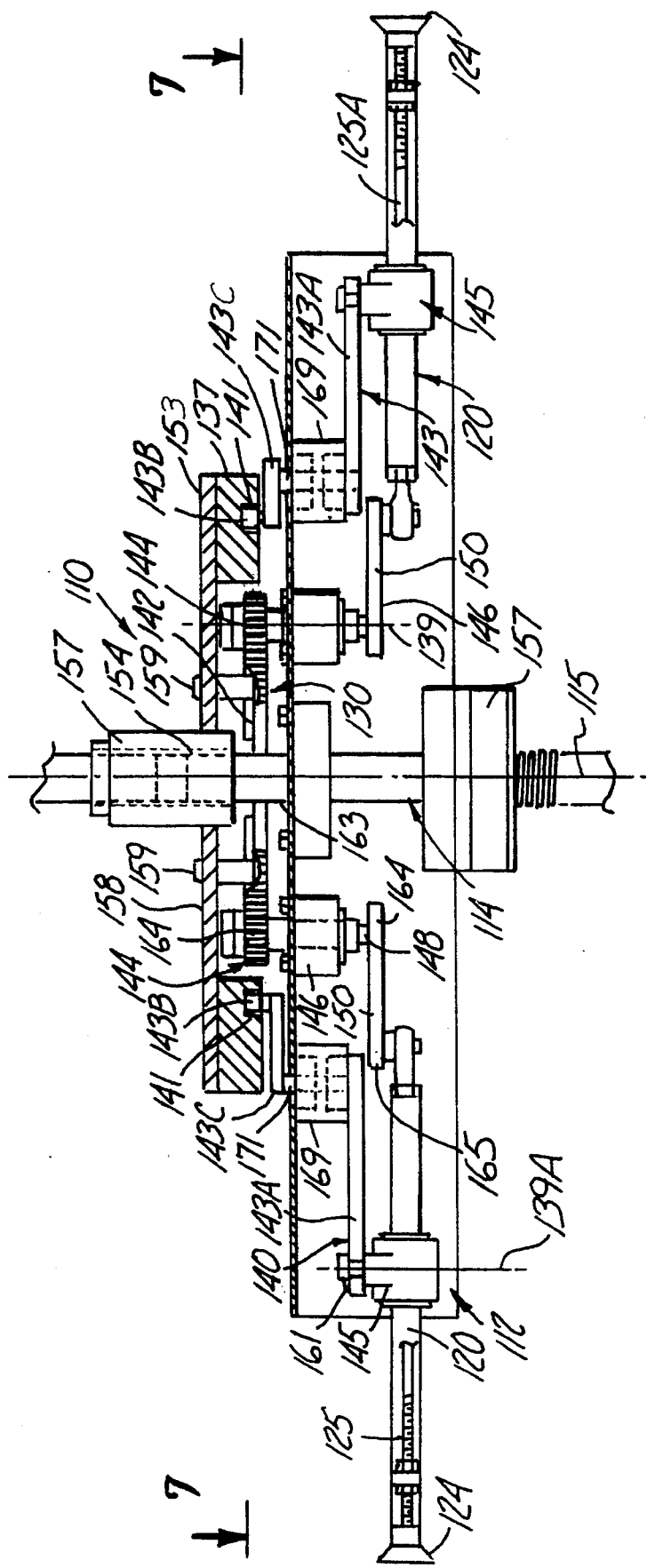

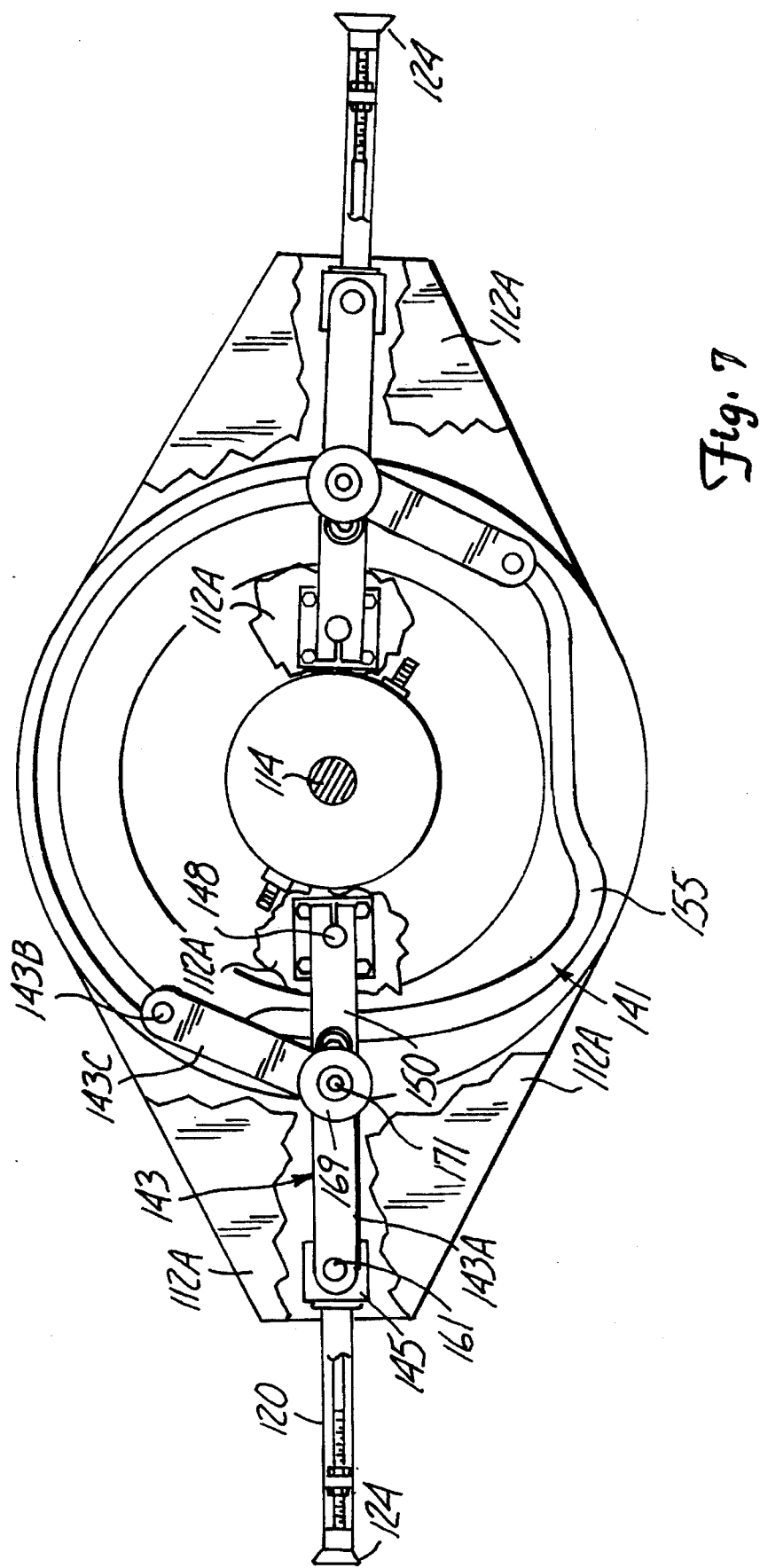

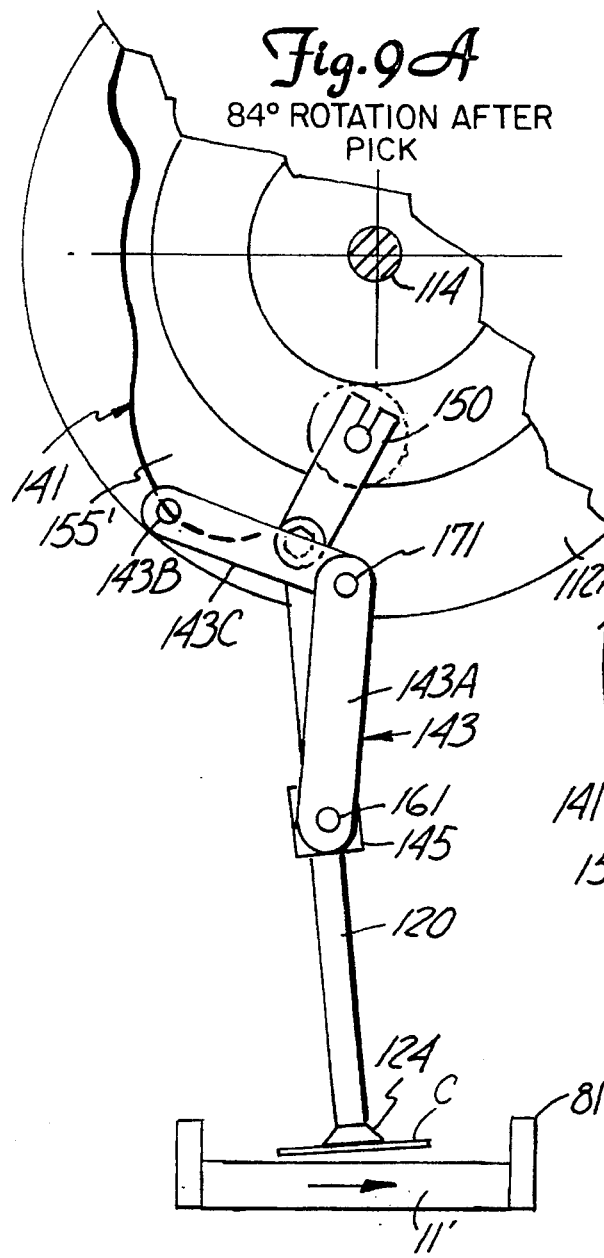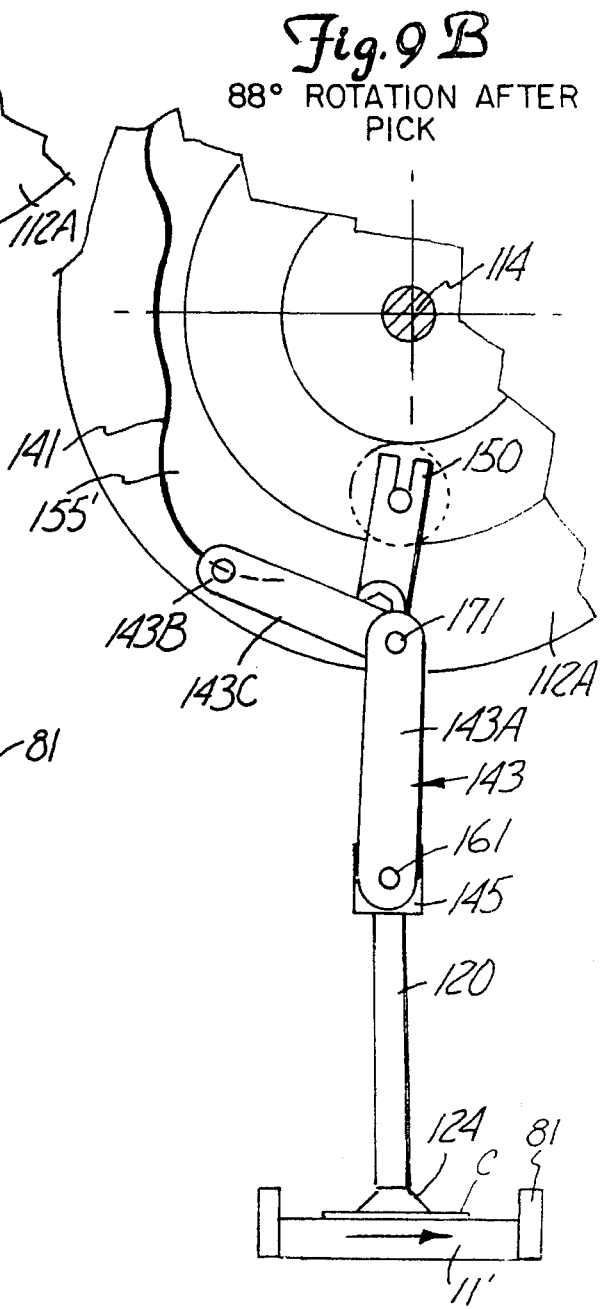

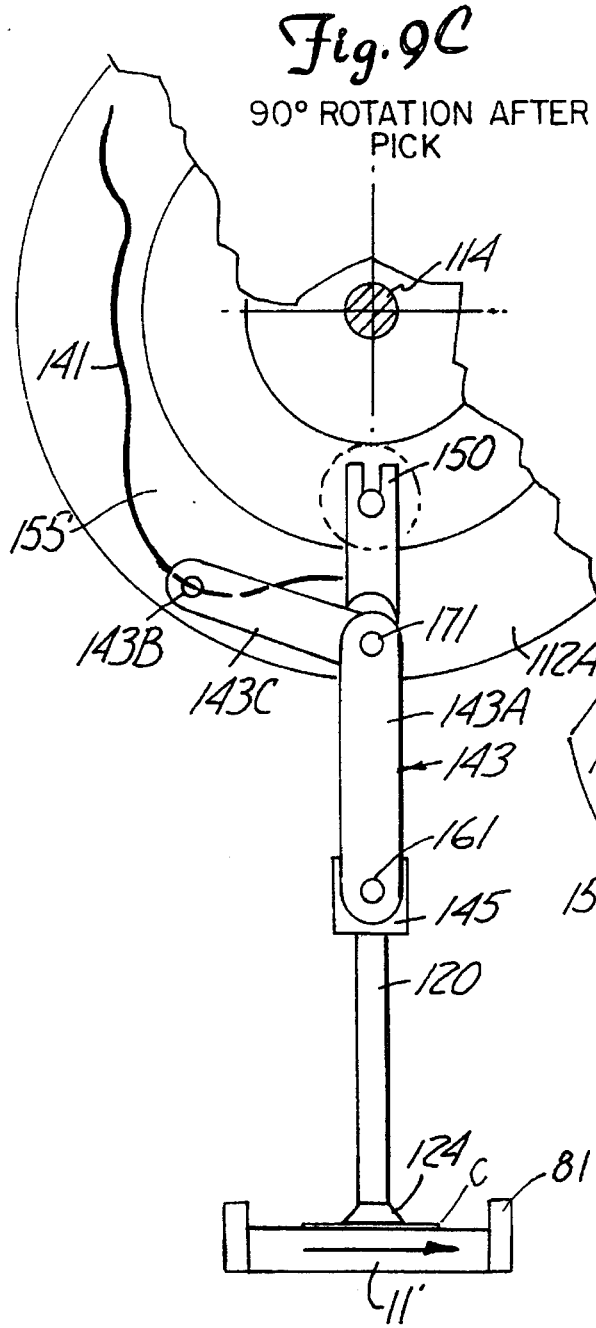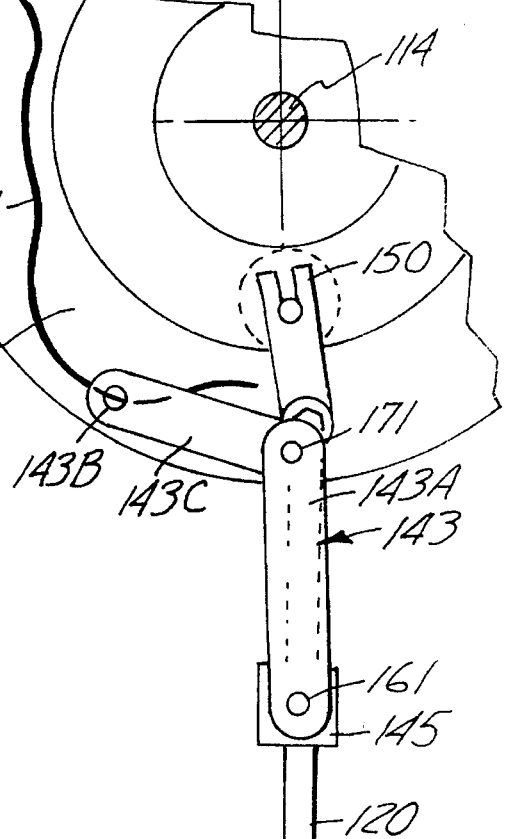

96° ROTATION AFTER PICK

ROTARY PLACER

BACKGROUND OF THE INVENTION

The present invention relates generally to placing apparatus, and more particularly, to a rotary placer which selectively picks up, transfers and places a blank from a fixed magazine wherein package blanks are contained in stacked arrangement to an assembly position which typically involves a conveyor.

Rotary placers typically include one or more arms which rotate about a central axis. Vacuum cups attached to the ends of the arms pick up a carton blank from a pick position at the magazine, transfer the carton blank by rotation of the arm, and disengage the carton blank at a place position on the conveyor or other apparatus for assembly. In many of these devices the carton blanks are engaged and disengaged by a wiping or sweeping motion as the vacuum cups rotate past the pick and place positions.

However, it is desirable for the vacuum cups to move in substantially straight line in and out motion at the pick and place positions. The straight-line motion at the pick position ensures that facing areas of the carton blank will be initially separated to facilitate further squaring of the blank at the assembly or place position and also to ensure that improper bending of the carton blank will be avoided. Further, the location of the vacuum cups on the carton blank is more precise and the chances of a faulty delivery of a squared blank from the rotary placer to the assembly position is lessened.

Some rotary devices use a cam surface to reciprocate the vacuum cups at the pick and place positions and thereby effectuate straight line motion. However, the problem with many of these devices is that they do not rotate continuously since they have to stop at the pick and place positions to permit the vacuum cups to reciprocate. Thus, these devices are slower and less efficient than continuously rotating devices.

Since it is desirable that the rotary placer be continuously moving when effectuating a pick from the magazine and since it is also desirable that the pick occur using straight line motion, some devices include gear assemblies and cam tracks to reciprocate the vacuum cups and to move the vacuum cups linearly outward at the pick position. The cam track causes a shaft mounting the vacuum cups to swing in a direction opposite to the direction of rotation of a rotating turret and at the same time matching the speed of the turret thereby effectuating straight line motion of the vacuum cups as the rotary placer is rotating.

Other devices imparting linear motion of the vacuum cups during continuous rotary motion of the placer which are cheaper and easier to manufacture, and which are more efficient and more reliable to operate are similarly desirable.

SUMMARY OF THE INVENTION

The present invention is a rotary placer for picking a blank from a magazine stack or first position and transferring the blank to place it in a second place or assembly position. The rotary placer includes a frame driven for rotation about a first axis, and blank moving means. The blank moving means includes an arm having an inner end and an outer end and a gripping member connected to the outer end of the arm for engaging and releasably retaining a blank for movement from the pick position to the place position. Reciprocating means are connected to the inner end of the arm and to the frame for reciprocating the arm from an extended position where the gripping member engages a blank in the magazine store to a retracted position where the gripping member retains the blank for movement. The reciprocating means again extends the arms at the place position where the gripping means disengages the blank. The reciprocating means also pivots the arm about a second axis as the arm reciprocates, the second axis being parallel to the first axis. Guide means are connected to the frame and to the arm between the inner and outer ends for displacing the gripping member laterally of a plane that rotates about the first axis and includes the first and second axes.

In one embodiment the guide means includes a guide track connected to the frame, and a follower pin protruding from the arm and sliding in the guide track such that the pin traverses the guide track and guides arm movement as the arm is reciprocated.

In another embodiment the guide means includes a normally stationary cam surface, a linear bearing which slides up and down the arm as the arm is rotated and reciprocated by an orbiting crank so it is moved laterally of the plane which includes the first and second axes, as controlled by a bell crank pivotally attached to the linear bearing and engaged with the cam surface.

BRIEF DESCRIPTION OF THE DRAWINGS

FIG. 1 is a top plan view of a first embodiment of a rotary placer of the present invention with a portion of the frame broken away;

FIG. 3 is a side elevational view of the rotary placer of the present invention viewed from an opposite side from FIG. 2;

FIG. 6 is a top plan view of another embodiment of the present invention with a portion of the frame broken away;

FIG. 7 is a sectional view along line 7—7 in FIG. 6 with a large portion of the frame broken away;

FIGS. 9A, 9B, 9C, 9D and 9E are schematic side elevational views of the embodiment shown in FIG. 6 illustrating secondary motion of the arm at the place position when the rotary placer is used for coupon placement.

DETAILED DESCRIPTION OF THE PREFERRED EMBODIMENTS

Figure 2A:
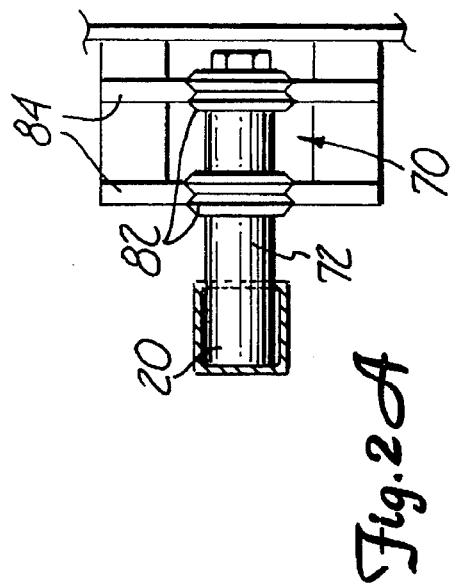
FIG. 2A is a fragmentary sectional view along line 2A—2A in FIG. 2.
Figure 2:
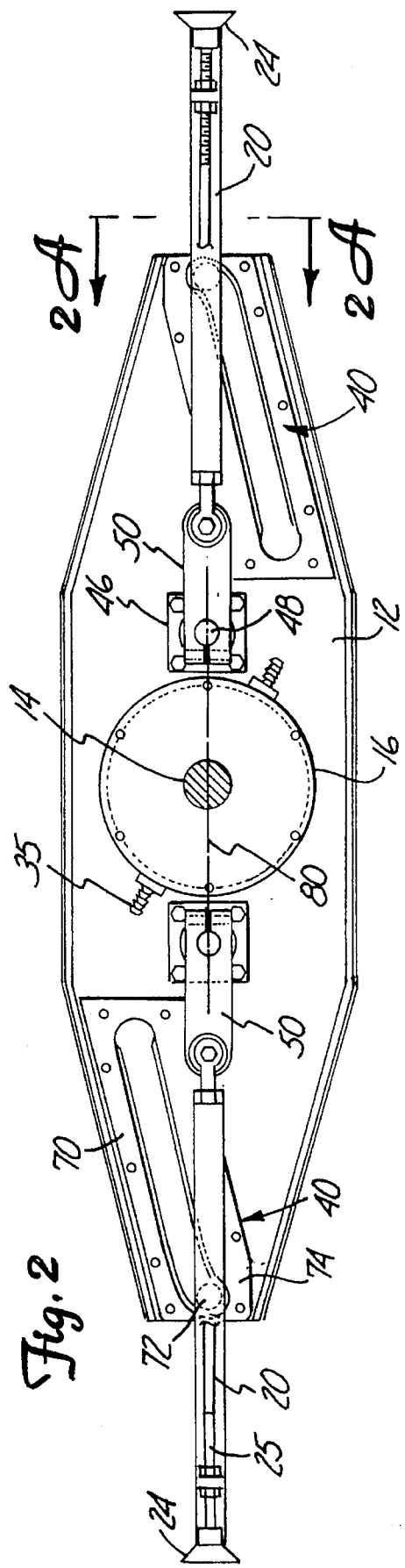
FIG. 2 is a side elevational view of the rotary placer of the present invention.

Referring to FIGS. 1–3, a rotary placer 10 picks up a carton or other blank 11 from a pick position at a magazine stack 13, moves the carton 11 to a conveyor (not shown) at a place position and places the carton 11 on the conveyor for opening and filling. The rotary placer 10 includes a frame 12 mounted on a shaft 14 for rotation about a central axis 15.

A hub 16 and suitable locking members drivably connect the frame 12 to the shaft 14. External drive means 17 rotates the shaft 14 and then the frame 12 about the central axis 15. The shaft 14 is mounted in suitable bearings to a machine frame shown schematically at 19 wherein the pick and place positions are typically spaced by 90 degrees.

The rotary placer 10 as shown includes a pair of arms 20 mounted on the frame 12 and having outer ends extending outwardly from the frame 12. At least one arm 20 is used, and the frame can carry four or more arms if desired. Each arm 20 has a gripping member, commonly a pair of vacuum cups 24 adjustably mounted on a bracket 27A which is attached to an outer end of each arm 20 to engage and releasably retain a single carton 11 for removal from the magazine stack 13 and movement to a place position for further handling. The cartons are shown as being erected and placed on a conveyor. The rotary placer 10 includes a gear assembly 30 for controlling movement of the vacuum cups 24 (using an orbiting gear and crank, as will be further explained) from a first extended position (FIG. 4A) where the vacuum cups 24 engage and pick up a carton 11 at the magazine under a vacuum to a retracted position (FIG. 4C) as the frame 12 rotates to move the carton 11 to the place position where the vacuum cups 24 again are extended (FIG. 4D) and the vacuum is cut off to release the carton 11. Guide means 40 connected to the frame 12 and to the arm 20 alters the reciprocal motion of the arm 20 such that the outer end portion of arm 20 moves generally linearly along a straight line at the pick position after the vacuum cups 24 engage the carton 11 and at the place position after the vacuum cups 24 disengage the carton 11 and such that the arm 20 moves non-linearly along a curved path from the pick position to the place position while transporting the carton 11.

Figure 4E:
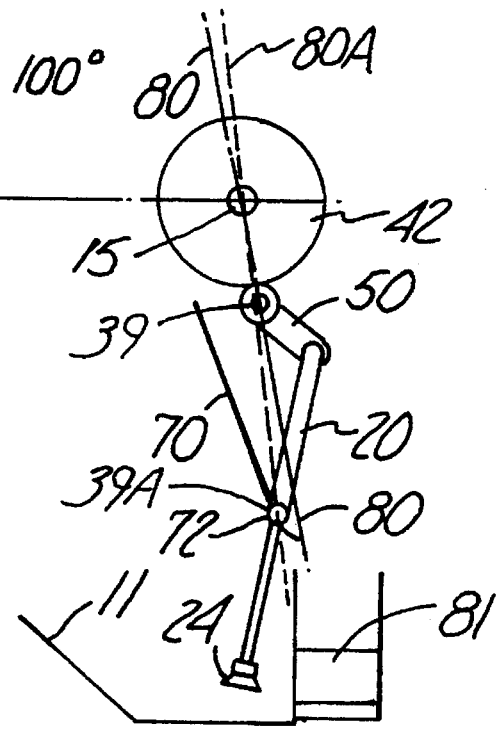
Figure 5:
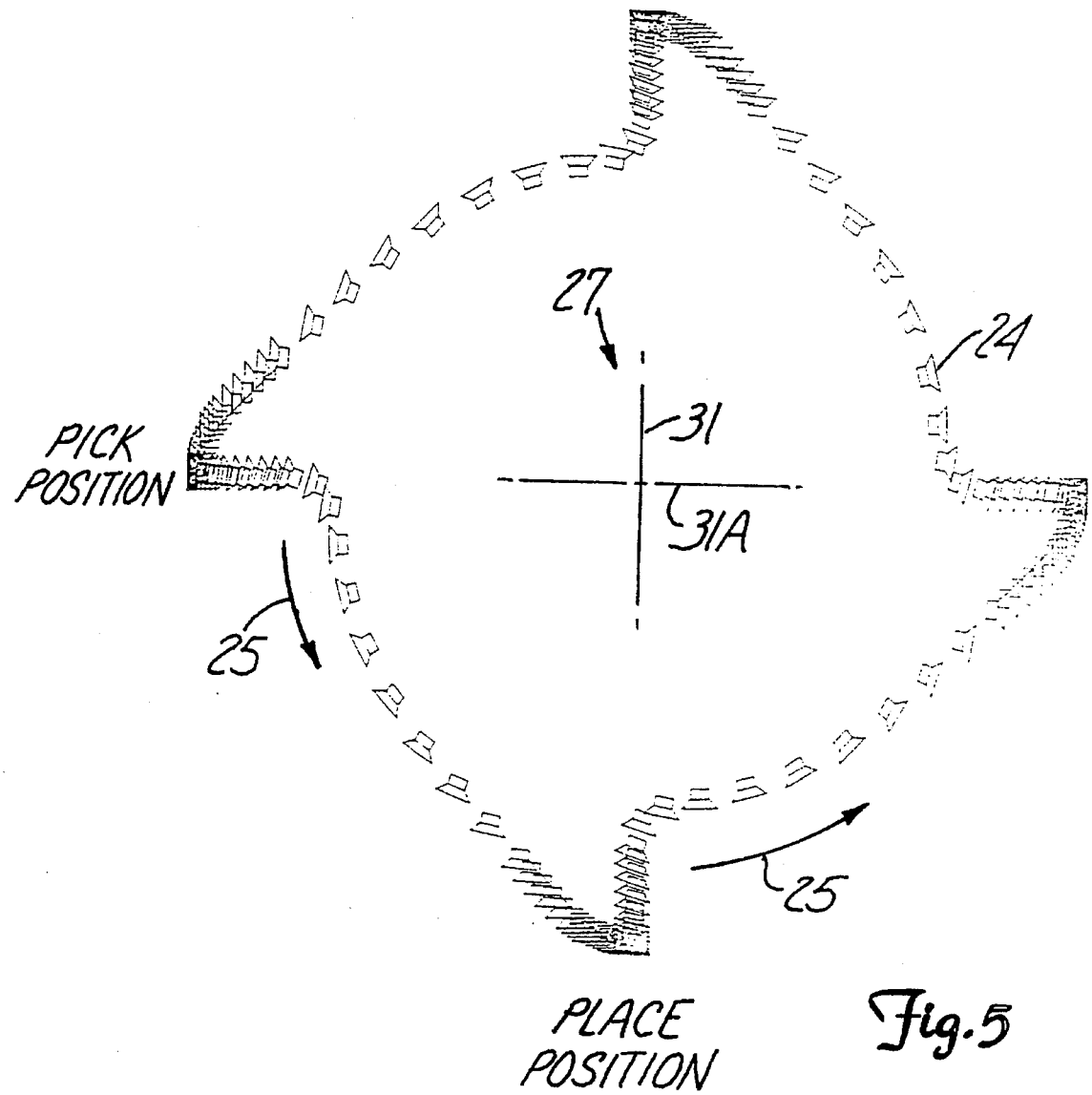
FIG. 5 is a schematic diagram showing movement of the vacuum cup through one entire revolution of the rotary placer.

The combined effect of the gear assembly 30 and the guide means 40 on the motion of the vacuum cups 24 through one entire revolution of the rotary placer 10 is illustrated in FIG. 5. Without the use of the guide means 40 the vacuum cups 24 would move along an arcuate path between the pick and the place position with the retracted position being midway between the pick position and the place position. However, the guide means 40 alters the arcuate motion of the vacuum cups 24 such that the vacuum cups 24 reach the extended position at the pick position and retract in a desired controlled path as the frame 12 and arm 20 rotate in the direction indicted by arrow 25, and such that the arm 20 reaches the extended position at the place position and retracts along a similar controlled path. In other words, as the frame 12 rotates counterclockwise at a fixed, constant speed, the vacuum cups 24 move clockwise laterally at such a speed that the vacuum cups 24 have a zero angular movement relative to a reference plane such as a plane lying on an axis 31 and perpendicular to an axis 31A (See FIG. 5). Linear motion of the vacuum cups 24 toward and away from the cartons in the magazine stack 13 at the pick position permits easy removal of the carton from the magazine stack 13 while linear motion of the vacuum cups 24 at the place position permits the vacuum cups 24 to clear a folded edge of the carton (FIG. 4E).

Referring back to FIG. 2, the vacuum cups 24 are mounted on axially adjustable vacuum stems which are parallel to the arm 20. Hoses 25A connect the vacuum stems 25 to nipples 35 protruding from hub 16. The hub 16 is fixed to and rotates with shaft 14 and has passageways carrying vacuum across a rotary sliding seal from a vacuum valve 16A that is held stationary and is connected to a vacuum source in a conventional manner.

Referring next to FIG. 3, the gear assembly 30 includes a central stationary sun gear 42 and a pair of planetary gears 44, each on a shaft 48 mounted in a separate mounting hub 46. Drive shafts 48 each drive a crank 50. The central gear 42 is mounted on the central axis 15 of the rotary shaft 14. A bearing 54 allows rotation of the rotary shaft 14 within the central gear 42 such that the central gear 42 does not rotate with the shaft 14. The central gear 42 is held stationary by a connecting rod. A spring 60 bears against plate 62 which in turn maintains a spring load on the rotary seal between vacuum valve 16A and hub 16. A connecting rod 58 is attached to a spoke on the central gear 42. A connecting rod 59 is attached to the plate 62 and is adjustable to permit adjusting the vacuum connections so that the vacuum to the vacuum cups 24 can be initiated and disconnected at different angular positions of the arms 20. Hub 16 and vacuum valve 16A are made of suitable low coefficient of friction materials.

The planetary gears 44 are driven by teeth 64 of the central gear 42 so that when the frame 12 is rotated, the planetary gears 44 rotate around the drive shafts 48 about axes 39 and orbit about the central axis 15. The drive shafts 48 connect inner ends 64 of the respective cranks 50 to the planet gears 44. Outer ends 65 of the cranks 50 rotatably attach to an inner end of the respective arm 20 such that when planetary gears 44 rotate, cranks 50 drive about the axis 39 thereby causing the attached arms 20 to reciprocate from the extended position to the retracted position as guided by the guide means 40.

Referring to FIGS. 2 and 2A, each of the guide means 40 includes a cam guide track 70 connected to the frame 12 and a guide pin 72 protruding from the arm 20 between the inner and outer ends thereof at an axis 39A and having cam followers 82 thereon to follow along flanges 84 of the respective guide track 70. Each guide track 70 is generally linear with a slight hook at an outer end 74 thereof, as shown. The linear sections of the guide tracks 70 are positioned at a selected acute angle relative to a bisecting plane 80 defined by the central axis 15 and the axes 39. When the vacuum cups 24 are completely extended or retracted the longitudinal axes of arms 20 also lie on this plane. The reciprocating motion of the arms 20 causes the respective guide pin 72 to traverse the associated guide track 70 which thereby displaces the vacuum cups 24 laterally of the plane 80 and laterally of a plane 80A defined by the central axis 15 and the axes 39A during reciprocation of the arms 20. Movement of the vacuum cups 24 laterally of the plane 80 and 80A as controlled by the cam guide track 70 permits imparting linear movement to the vacuum cups 24 away from the surfaces of cartons as the frame 12 is rotated adjacent the pick position and the place position.

In the embodiment illustrated, the rotary placer 10 has two arms 20 spaced 180 degrees apart from each other, each arm 20 having a gear assembly 30 and guide means 40 of the same construction as described above, however, additional arms and associated gear assemblies and guide means of the same construction as described above may be positioned about the central gear 42 in order to reduce the speed with which the frame 12 must rotate to move the same number of cartons. The number of arms 20 positioned around the central gear 42 is limited only by the dimensions of the cartons 11 which are transported and the physical constraints of frame 12. The amount of straight line motion of the vacuum cups 24 may be increased or decreased to suit the particular needs of a user by increasing or decreasing the overall size of the rotary placer 10, and more particularly by increasing or decreasing the size of the crank 50 and arm 20.

In the embodiment illustrated, the gear ratio between the central gear 42 and the planetary gear 44 is 4:1. The gear ratio indicates the frequency with which the vacuum cups 24 are reciprocated from the extended position to the retracted position during one complete revolution of the rotary placer 10. The gear ratio may be varied to suit particular needs by changing the size of the gears or by rotating the central gear 44 independent of the shaft 14. If the central gear is rotated in a direction opposite the shaft 14, then the effective gear ratio will increase. If the central gear is rotated in the same direction of the shaft 14, and at a lower speed, then the gear ratio will decrease. If the central gear is rotated in the same direction of the shaft 14, and at a greater speed, then the gear ratio will increase.

Figure 4A:
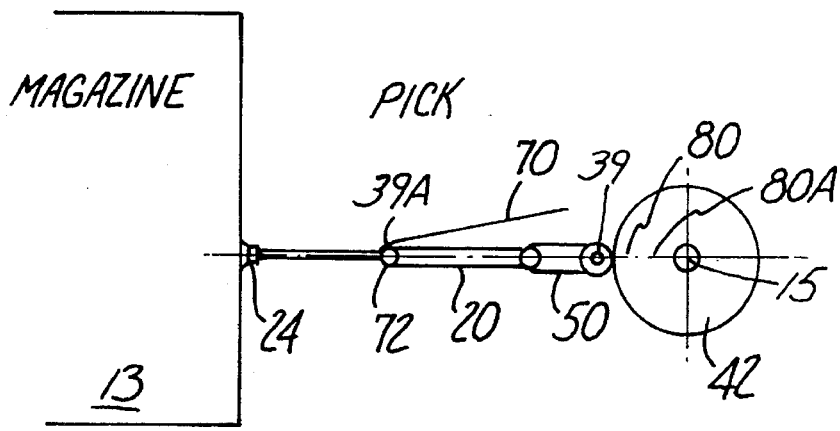
FIGS. 4A, 4B, 4C, 4D, and 4E are schematic side elevational diagrams of the rotary placer which show the relative position of the arm in relation to the guide track as a carton is moved from a pick position to a place position.
Figure 4B:
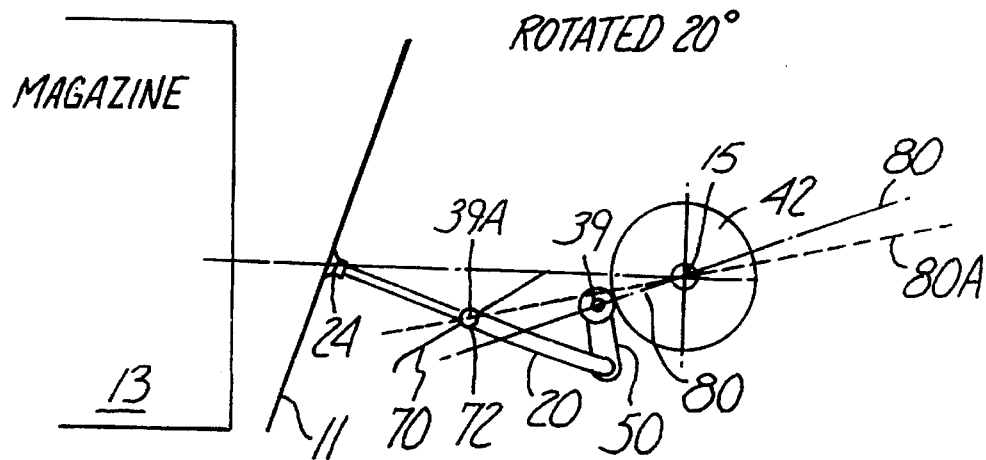
Figure 4C:
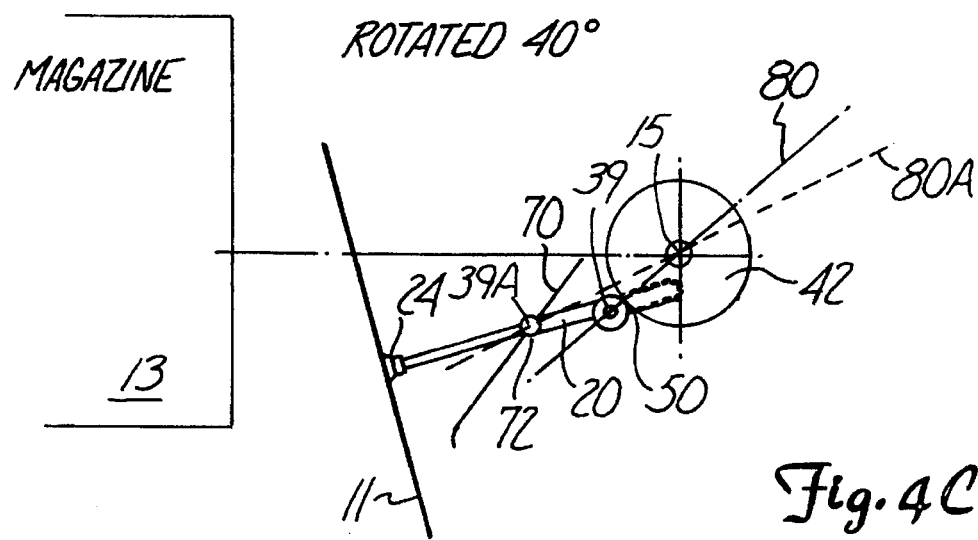
Figure 4D:
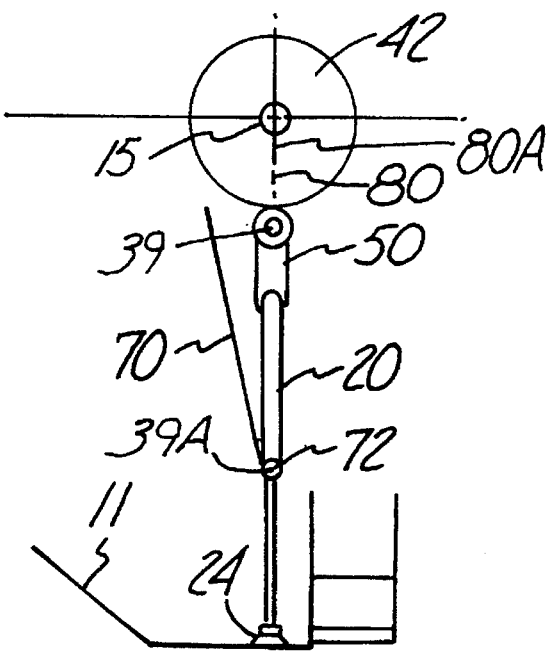

FIGS. 4A through 4E schematically show the positioning of the planetary gears 44, cranks 50, arms 20, vacuum cups 24 and guide tracks 70 in relation to the central gear 42 as the rotary placer 10 picks up the carton 11 at the magazine stack 13, transports the carton 11 and places the carton 11 at the assembly position. In FIG. 4A (pick position) the vacuum cups 24 engage the carton 11. The axes of the crank 50, the arm 20, and vacuum cups 24 at that position are positioned in plane 80 plane defined by the central axis 15 and axis 39 and in plane 80A defined by the central axis 15 and axes 39A. At the pick position, the guide pin 72 for that arm 20 is in the hook portion of the guide track 70.

FIG. 4B shows the rotary placer 10 after 20 degrees counterclockwise rotation. In this position, the planetary gear 44 and the crank 50 have rotated counterclockwise, thereby reciprocating the arm 20 toward the retracted position. As the arm 20 reciprocates, the guide pin 72 is guided along the guide track 70 thereby maintaining the vacuum cups 24 first along substantially a linear path in a direction away from and substantially perpendicular to the surface of cartons in magazine 13. In other words, the guide means 40 enables the plane of the edges of the vacuum cups 24 to tilt clockwise laterally of planes 80 and 80A and pull a carton out of the magazine essentially along a line perpendicular to the carton surface as the frame 12 rotates counter clockwise about the central axis 15.

FIG. 4C schematically shows the rotary placer 10 about midway between the pick and place positions, the rotary placer having been rotated 40 degrees. FIG. 4D schematically shows the rotary placer 10 at the place position and all of the components are aligned the same as in the pick position except that in FIG. 4D the leading flap of the carton 11 has traveled upward in response to the rotational movement of the rotary placer 10 and the leading flap of the carton contacts an abutment or flight 81 of a carton conveyor. The trailing flap of the carton will be folded by the next flight 81. FIG. 4E schematically shows the rotary placer 10 after the vacuum cups 24 have disengaged the carton 11 and are moving linearly away from the carton 11 in order to clear the leading flap of the carton 11. The opening of the carton can take place as the cartons reach the place position in a known manner.

Another exemplary embodiment of the present invention is illustrated in FIGS. 6 and 9. The various elements illustrated in FIGS. 6 and 9, which correspond to elements described above with respect to the embodiment illustrated in FIGS. 1–5, are designated by corresponding reference numerals increased by one hundred. Unless otherwise stated, elements illustrated in the embodiments of FIGS. 6 and 9 operate in the same manner as in the embodiments of FIGS. 1–5.

Referring to FIGS. 6 and 7, the rotary placer 110 includes arms 120 having vacuum cups 124 attached to outer ends thereof for engaging and releasably retaining cartons for movement from a pick position to a place position. The rotary placer 110 includes a sun and planetary gear assembly 130 for reciprocating the vacuum cups 124 from a first extended position where the vacuum cups 124 engage and pick up a carton to a retracted position for transport and then out to a second extended position where the carton is placed and released from the vacuum cups. Guide means 140 comprising a bell crank 143 pivotally connected to the frame 112 and slidably guiding the respective arm 120, controls the motion of the respective arm 120 such that the arm 120 moves generally linearly away from a carton along line perpendicular to a magazine 13 at the pick position when the vacuum cups 124 engage carton 11 and away from a support at the place position where the vacuum cups 124 release the carton 11. In other words, as the frame 112 rotates counterclockwise at a constant speed, the vacuum cups 124 move clockwise laterally at such a speed that the planes of the edges of the vacuum cups 124 have substantially a zero angular movement relative to the plane of the magazine.

The gear assembly 130 includes a central gear 142, planetary gears 144, each drivably connected to a separate drive shaft 148, which are mounted in hubs 146. The central gear 142 is mounted on the rotary shaft 114 which has an axis 115. In this form of the invention, a circular cam is utilized, as will be explained, and the cam is preferably held stationary along with the central gear 142. As shown, a cam plate 153 has a hub 157 that rotatably mounts the shaft 114 through a bearing 154. The bearing 154 allows the shaft 114 to rotate within the central gear 142. As shown, central gear 142 is held on the cam plate 153 by bolts 159 that extend through spacers. The gear 142 and hub 157 are held axially positioned by a pair of clamp collars 163 on the shaft 114.

The planetary gears 144 engage teeth 164 of the central gear 142. The mounting hubs 146 are fixed to the frame 112 so that when the frame 112 is rotated as shaft 114 is driven, the planetary gears 144 rotate about an axis 139 of the drive shaft 148 carried in hubs 146 and orbit about the central axis 115. The drive shafts 148 drivably mount inner ends 164 of the respective cranks 150. Outer ends 165 of cranks 150 are pivotally attached to the inner ends of the respective arms 120 such that when the planetary gear 144 rotates, the cranks 150 are driven about the axes 139, thereby causing the arms 120 to reciprocate from the extended position to the retracted position as the arms 120 are carried with the frame 112.

The guide means 140 includes a box cam 137 mounted on plate 153 and having a cam track 141 formed therein. Bell crank 143 has a first arm 143C that mounts a cam follower 143B, and a second arm 143A having a linear bearing 145 pivotally mounted thereon about an axis 139A parallel to axes 139 and 115. The arms 120 are slidably mounted in the respective linear bearing 145. The linear bearings 145 pivot as needed about pin 161 to accommodate the linear movement of arms 120. The box cam 137 is usually fixed to a mounting frame and encircles the central gear 142; however, it may be desirable to move the box cam 137 at the pick and/or place position.

Hubs 169 mount shaft 171 of bell crank 143 on bearings. The first arm 143A of each bell crank 143 is on an opposite side of a wall 112A of frame 112 from the second arm 143C so the cam followers 143B can move along cam track 141. As the frame 112 rotates with shaft 114, the cam track 141 will cause the bell crank 143 to pivot relative to frame 112 and cause the linear bearings 145 on the first arm 143A of the bell crank 143 to change position.

The cam track 141 has at least one cam lobe 155 formed where the distance between the cam track 141 and central axis 115 changes. The cam track 141 changes the position of the linear bearings 145 as the frame 112 rotates counterclockwise about the central axis 115. The arms 120 pivot clockwise with an angular speed as the frame 112 rotates so as to have substantially zero annular movement relative to the cartons in the magazine 13 at the pick position. In other words, the vacuum cups 124 are displaced laterally of a reference plane 180 defined by the central axis 115 and the axes 139 and a reference plane 180A defined by the central axis 115 and axes 139A as the frame 112 rotates counterclockwise about the central axis 115. The movement of the arms 120 and thus vacuum cups 124 is proportional to the amount of movement of the bell crank 143 as controlled by cam track 141.

Additional cam lobes may be placed along the cam track 141 at desired locations to cause additional desired motion of the vacuum cups 124 such as, for example, linear motion at the place position. Also, by changing the shape of a cam lobe 155' at the place position, for example, it is possible to induce secondary motion of the vacuum cups 124 such that a blank is kicked forward in the direction of and at the same speed as the blank conveyor in order to assure accurate placement of the blank on the blank conveyor (see FIGS. 9A–9E). Secondary motion is particularly desirable for coupon placement in order to allow glue on the backside of the coupon to adequately adhere to the moving blank.

The linear bearings 145 let the arms 120 slide easily and permit the cranks 150 to rotate and reciprocate the arms 120 from the extended position to the retracted position.

Figure 8A:
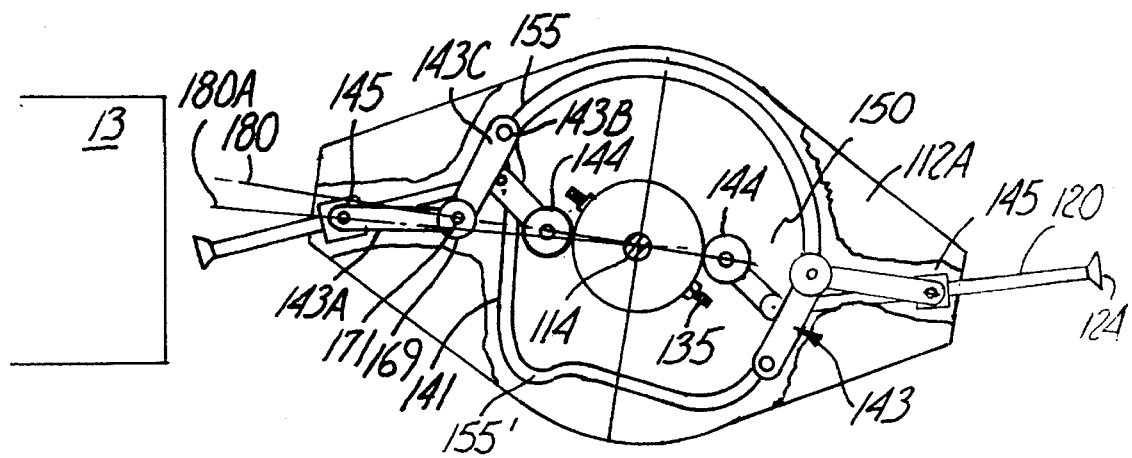
FIGS. 8A, 8B, and 8C are side elevational views of the embodiment shown in FIG. 6 illustrating the relative position of the arm in relation to the cam surface as a carton is engaged at the pick position.
Figure 8B:
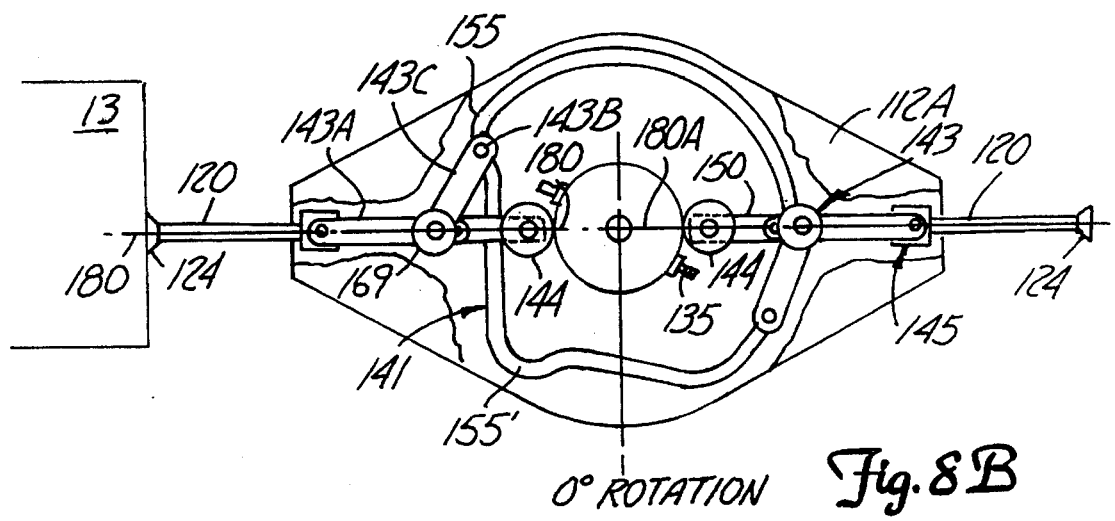
Figure 8C:
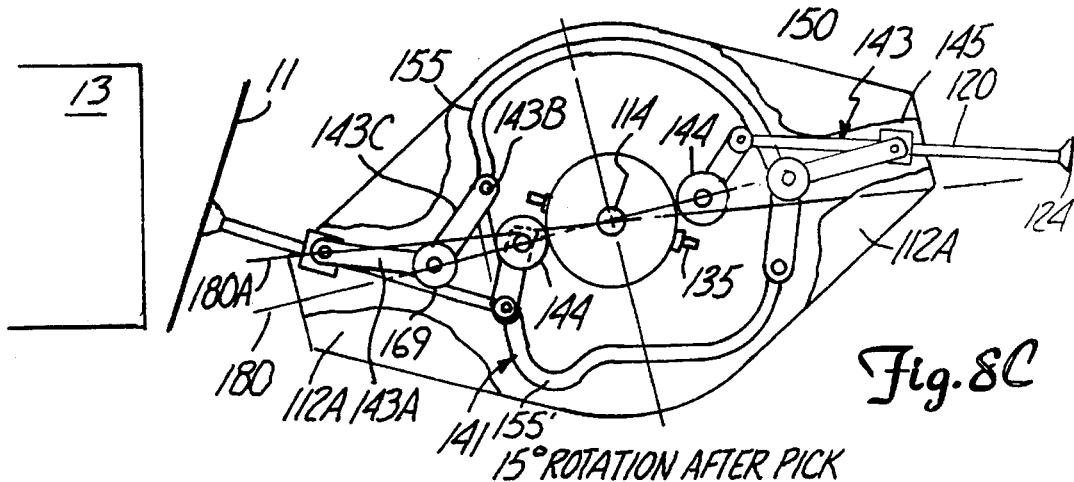

FIGS. 8A, 8B and 8C schematically show the positioning of the left side planetary gear 144, crank 150, arm 120, vacuum cups 124, linear bearing 145, and bell crank 143 in relation to the central gear 142 as the rotary placer 110 picks up the carton 11 at the magazine 13. The figures have been illustrated with the wall 112A of frame 112 broken away in large parts to show the cam track 141, while also leaving the bell crank 143 in solid lines.

In FIG. 8A the pivot shaft 171 of the left bell crank 143 is shown with cam follower 143B approaching the cam lobe 155. Clockwise rotation of the left crank 150 has caused the arm 120 to pivot on the linear bearing 145 clockwise while the arm 120 slides within the linear bearing 145, in approach of the pick position.

In FIG. 8B the left linear bearing 145 and second arm 143C of the bell crank 143 are aligned or on center with the reference plane 180 for picking up the carton from magazine stack 13. In FIGS. 8B and 8C the first arm 143A of the bell crank 143 is shown pivoting to move the second arm 143C as cam follower 143B traverses the cam lobe 155 at the pick position, which causes the second arm 143C of the bell crank 143 to pivot clockwise about pivot shaft 171 at a speed synchronized with the counterclockwise rotation of the frame 112 such that the vacuum cups 124 move linearly away from the magazine 13 at the pick position along a line substantially perpendicular to the surface of cartons or sleeves in magazine 13.

FIGS. 9A–9E schematically show the positioning of the planetary gear 144, crank 150, arm 120, vacuum cups 124, linear bearing 145 and bell crank 143 in relation to a cam lobe 155' as the rotary placer 110 places a coupon "C" on a carton 11'. The rotary placer can be used for applying labels or coupons onto carton surfaces at a high rate. The figures have been illustrated with the wall 112A of frame 112 broken away in large parts to show the cam lobe 155'.

As the cam follower 143B traverses the cam lobe 155' it causes the arm 120 to kick forward at substantially the same speed and in the same direction as the carton 11' on the carton conveyor. This 'kick" or secondary motion is to ensure that the coupon can be placed on a carton surface while traveling at the same speed as the carton so it will not slide on the surface and any adhesive used will secure the coupon on the carton or other object. In FIG. 9A the cam follower 143B is on the cam lobe 155' and the vacuum cups 124 are shown in approach of the place position and the coupon C is not yet in contact with the carton 11'.

FIGS. 9B, 9C and 9D show the rotary placer 110 undergoing secondary accelerated forward motion as the vacuum cups 124 remain in contact with the coupon C through approximately at least four degrees of rotation through the place position. The coupon is moved at the same speed as the carton as it contacts the carton for a short distance before the vacuum is released and the vacuum cups 24 drawn linearly away to clear obstructions, such as conveyor flight 81. The vacuum may be released either just after the initial kick or the end of the secondary motion.

Figure 9E:
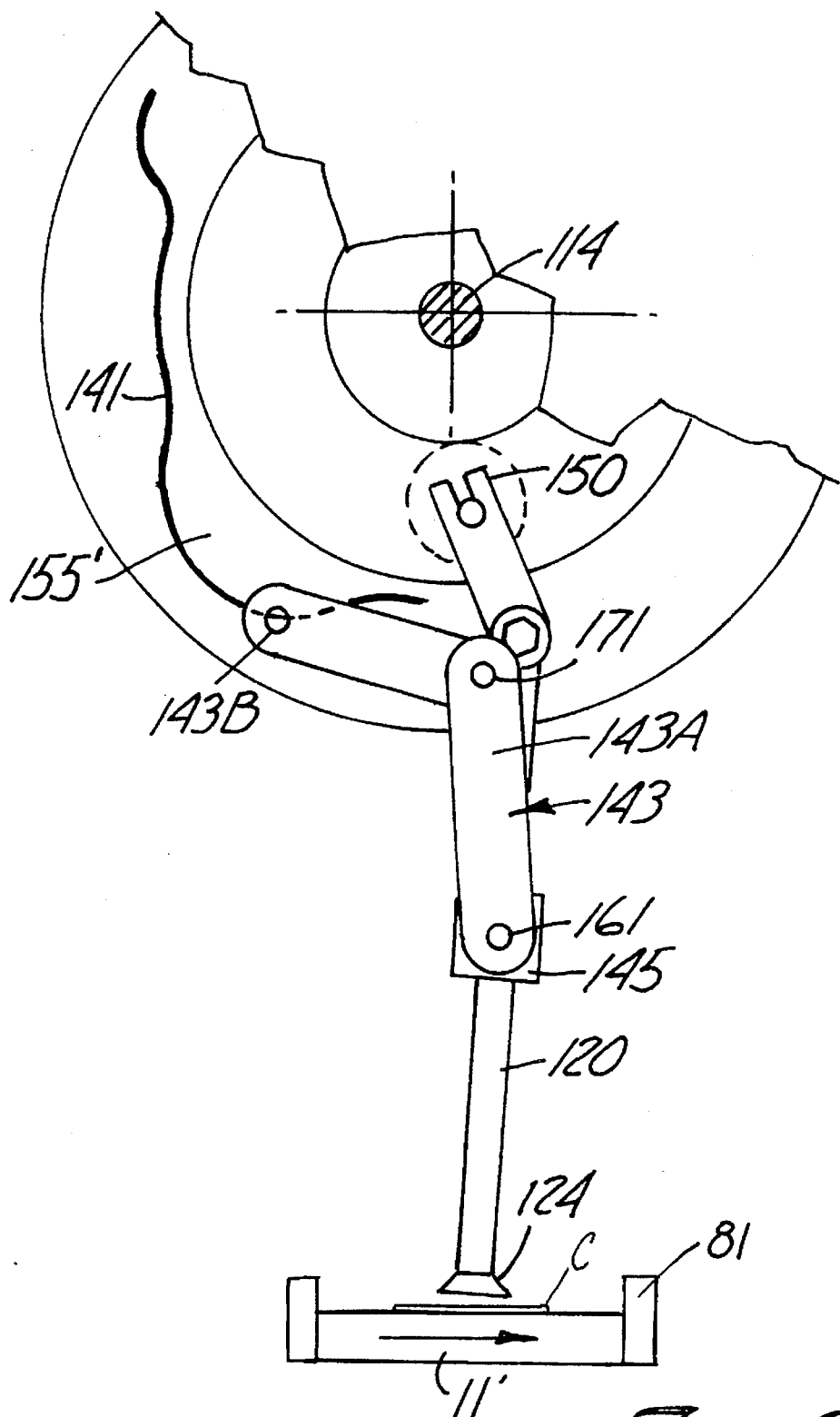

FIG. 9E shows the vacuum cups 124 after secondary motion is complete and after the vacuum has been cut off. The vacuum cups are shown being pulled linearly away from the carton in a manner similar to the motion at the pick position, except that the secondary motion caused by the cam lobe 155' has in essence expanded the linear dimensions of the place position and altered the speed of movement in direction of movement of the carton. As mentioned above, secondar motion is particularly useful for coupon placement, but it is also useful any time the object being placed has to move at the same speed as the conveyor on or object which it is being placed for a short distance.

In summary, the rotary placer 10,110 of the present invention rotates continuously at a fixed speed and effectuates straight-line picking using cam guide means which alter the direction of movement of the arm while the arm is reciprocated by a crank. The present invention is more reliable to operate and easier to manufacture than other rotary placers.

Although the present invention has been described with reference to preferred embodiments, workers skilled in the art will recognize that changes may be made in form and detail without departing from the spirit and scope of the invention.

What is claimed is:

1. A rotary placer for moving a blank from a store at a pick position to a place position, the rotary placer comprising:
    a frame driven for rotation about a first axis; and
    a blank moving assembly comprising:
        a reciprocating arm having an inner end and an outer end;
        gripping means for engaging and releasably retaining the blank for movement from the pick position to the place position, the gripping means being connected to the outer end of the reciprocating arm;
    a reciprocating drive including a stationary gear mounted on the first axis, a planetary gear rotatably mounted on the frame about a crank axis and engaged with the stationary gear such that as the frame is rotated the planetary gear rotates about the crank axis and orbits about the first axis, and a crank on the frame driven by the planetary gear about the crank axis and pivotally connected to the inner end of the reciprocating arm, and the crank reciprocating the reciprocating arm from an extended position where the gripping means is positioned to engage and pick the blank from the store to a retracted position, the crank also pivoting the reciprocating arm about a second axis positioned between the inner and outer ends of the reciprocating arm as the reciprocating arm reciprocates; and guide means connected to the frame and to the reciprocating arm between the inner and outer ends for controlling the path of movement of the gripping means relative to a plane including the first and second axes.

2. The rotary placer of claim 1, wherein the guide means causes the gripping means on the reciprocating arm to pivot about the second axis in an opposite direction from the direction of frame rotation about the first axis as the frame leaves the pick position to cause the gripping means to move away from the store at the pick position along a desired line extending outward from a surface of the blank.

3. The rotary placer of claim 2, wherein the line of movement of the gripping means is perpendicular to a surface of the blank when the frame is leaving the pick position.

4. The rotary placer of claim 2, wherein the guide means causes the gripping means to pivot about the first axis in a direction to cause the gripping means to move substantially along a desired line immediately after reaching the place position as the reciprocating means is causing the reciprocating arm to reach its retracted position.

5. The rotary placer of claim 4, wherein the guide means causes the gripping means to retract along a desired line as the reciprocating arm is reciprocated to the retracted position sufficiently for the gripping means to clear an outwardly folded flap of the blank in the place position.

6. A rotary placer for moving a blank from a store at a pick position to a place position, the rotary placer comprising:

a frame driven for rotation about a first axis;

an arm having an inner end and an outer end and carried by the frame;

gripping means for engaging and releasably retaining the blank for movement from the pick position to the place position, the gripping means being connected to the outer end of the arm;

reciprocating means comprising a crank rotating about a crank axis connected to the inner end of the arm and rotatably mounted to the frame for reciprocating the arm from an extended position where the gripping means is positioned to engage and pick the blank from the store to a retracted position, the reciprocating means also pivoting the arm about a second axis relative to the frame as the arm reciprocates; and guide means including a guide track connected to the frame and a cam follower supporting the arm between the inner and outer ends for controlling pivotal movement about the second axis to control the path of movement of the gripping means relative to a plane including the first and second axes, the cam follower moving along the guide cam track as the arm is reciprocated.

7. The rotary placer of claim 6, wherein an outer portion of the guide track is hooked to cause the gripping means to shift laterally relative to the plane at a greater rate as the arm approaches its extended position.

8. The rotary placer of claim 1, wherein there are two blank moving assemblies disposed in the frame 180 degrees apart from each other.

9. A rotary placer for removing a blank from a store at a pick position and moving the blank to a place position, the rotary placer comprising:

a frame driven for rotation about a first axis;

a first arm having an inner end and an outer end;

gripping means for engaging and releasably retaining the blank for movement from the pick position to the place position, the gripping means being connected to the outer end of the first arm;

a reciprocating drive means connected to the inner end of the first arm and to the frame for reciprocating the first arm from an extended position where the gripping means is positioned to engage and pick the blank from the store to a retracted position, the reciprocating drive means also pivoting the first arm about a second axis positioned between the inner and outer ends of the first arm as the first arm reciprocates; and guide means having a cam surface and a cam follower connected to the first arm and the frame, a linear bearing slidably mounting the first arm between the inner and outer ends to guide extension and retraction of the first arm, the cam follower being movable along the cam surface and having a cam arm pivotally mounting the linear bearing, the cam follower caused be the rotating frame to move along the cam surface to control the position of the gripping means relative to a plane including the first and second axes.

10. The rotary placer of claim 9 wherein the cam follower is a bell crank having a bell crank pivot on the frame and having first and second bell crank arms, the first bell crank arm having a roller engaging the cam surface and the linear bearing being pivotally mounted to the second bell crank arm.

11. A rotary placer for moving a carton blank from a pick position at a carton store to a place position, the rotary placer comprising:

a stationary gear mounted on a central axis;

a frame driven for rotation about the central axis;

an arm positioned on the frame having gripping means on an outer end, the gripping means engaging and releasably retaining the blank for movement from the pick position to the place positioned;

a planetary gear rotatably mounted to the frame and a reciprocating drive connected to the planetary gear and an inner end of the arm opposite the gripping means for moving the arm relative to the frame, the planetary gear drivably engaging the stationary gear such that as the frame rotates the planetary gear rotates; and guide means connected to the frame and the arm at a first pivot between the inner and outer ends for permitting the arm to pivot about the first pivot, thereby permitting the gripping means to move about the first pivot in a rotational direction opposite from and with the same annular speed as the frame as the gripping means departs the carton store so as to have a substantially zero angular movement relative to the carton store, the arm being moved outwardly toward the carton store to a maximum extended position at the pick position.

12. The rotary placer of claim 11, wherein the guide means includes a guide track connected to the frame, and a track follower mounted on the arm and traversing the guide track as the arm moves relative to the frame, the track follower carrying the first pivot.

13. The rotary placer of claim 12, wherein an outer portion of the guide track is hooked to cause accelerated shifting of the gripping means relative to the frame as the arm approaches its maximum extended position.

14. The rotary placer of claim 11, wherein the guide means includes a cam surface and a cam follower carried by the frame to move on the cam surface for controlling position of the gripping means relative to the frame.

15. The rotary placer of claim 14, the guide means further including a linear bearing slidably mounting the arm to guide extending and retraction of the arm, the cam follower including a cam arm pivotally mounting the linear bearing.

16. The rotary placer of claim 14, wherein the cam surface includes a cam lobe which imparts secondary motion on the gripping means at the place position.

* * * * *